United States Patent
Azevedo et al.

(10) Patent No.: US 9,062,768 B2
(45) Date of Patent: Jun. 23, 2015

(54) PISTON WITH OIL COOLING PASSAGE AND METHOD OF CONSTRUCTION THEREOF

(71) Applicant: Federal-Mogul Corporation, Southfield, MI (US)

(72) Inventors: Miguel Azevedo, Ann Arbor, MI (US); Keith Hampton, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 54 days.

(21) Appl. No.: 13/946,866

(22) Filed: Jul. 19, 2013

(65) Prior Publication Data

US 2014/0020648 A1     Jan. 23, 2014

Related U.S. Application Data

(60) Provisional application No. 61/674,120, filed on Jul. 20, 2012.

(51) Int. Cl.

| | |
|---|---|
| *F01P 3/10* | (2006.01) |
| *F16J 1/09* | (2006.01) |
| *F02F 3/22* | (2006.01) |
| *F16J 9/22* | (2006.01) |
| *F16J 9/06* | (2006.01) |

(52) U.S. Cl.
CPC .............. *F16J 1/09* (2013.01); *Y10T 29/49265* (2015.01); *F02F 3/22* (2013.01); *F16J 9/22* (2013.01); *F16J 9/062* (2013.01)

(58) Field of Classification Search
CPC ................. F16J 1/09; F16J 9/062; F16J 9/22; F02F 3/22

USPC ......................... 123/193.6, 41.35; 29/888.048
See application file for complete search history.

(56) References Cited

U.S. PATENT DOCUMENTS

| | | | |
|---|---|---|---|
| 1,240,421 | A | 9/1917 | Coatalen |
| 1,465,647 | A | 8/1923 | Ludlam |
| 1,489,180 | A | 4/1924 | Weidely |
| 2,386,117 | A | 10/1945 | Hvid |

(Continued)

FOREIGN PATENT DOCUMENTS

| | | |
|---|---|---|
| DE | 3506399 | 8/1986 |
| DE | 4439582 | 5/1996 |

(Continued)

OTHER PUBLICATIONS

International Search Report Mailed on Oct. 17, 2013 (PCT/US2013/051383).

*Primary Examiner* — Marguerite McMahon
(74) *Attorney, Agent, or Firm* — Robert L. Stearns; Dickinson Wright, PLLC

(57) ABSTRACT

A piston for an internal combustion engine and method of construction thereof are provided. The piston includes a piston body having an upper combustion surface and an annular cooling gallery surrounding an undercrown region. An outer wall depends from the upper combustion surface. An annular ring belt region is formed in the outer wall adjacent the upper combustion surface. The ring belt region has at least one ring groove formed therein. At least one oil passage extends from the at least one ring groove to the cooling gallery. The oil passage has a first portion depending radially inwardly from the ring groove and a second portion ascending radially inwardly from the first portion to the cooling gallery.

19 Claims, 3 Drawing Sheets

(56) References Cited

U.S. PATENT DOCUMENTS

| | | | |
|---|---|---|---|
| 2,438,243 A | 3/1948 | Zoromskis | |
| 3,161,188 A | 12/1964 | Liebel et al. | |
| 3,521,531 A | 7/1970 | Kaesemodel | |
| 4,026,197 A | 5/1977 | Lapke et al. | |
| 4,428,330 A * | 1/1984 | Shimizu | 123/41.35 |
| 4,662,319 A * | 5/1987 | Ayoul | 123/41.35 |
| 4,669,369 A | 6/1987 | Holt et al. | |
| 4,741,543 A | 5/1988 | Geffroy et al. | |
| 4,785,720 A | 11/1988 | Kojima et al. | |
| 4,794,848 A | 1/1989 | Melchior | |
| 4,848,212 A | 7/1989 | Kawano et al. | |
| 5,860,395 A | 1/1999 | Klotz et al. | |
| 6,401,680 B1 * | 6/2002 | Zhu et al. | 123/193.6 |
| 8,201,537 B2 * | 6/2012 | Scharp | 123/193.6 |
| 8,689,743 B2 * | 4/2014 | Scharp | 123/41.39 |
| 2013/0206095 A1 * | 8/2013 | Azevedo et al. | 123/193.6 |

FOREIGN PATENT DOCUMENTS

| | | |
|---|---|---|
| DE | 10117932 | 10/2002 |
| JP | 5077605 U | 7/1975 |
| JP | 62138850 U | 9/1987 |
| JP | 6375309 | 4/1988 |
| JP | 2005036690 | 2/2005 |
| JP | 2006194109 | 7/2006 |
| JP | 2009-243357 | 10/2009 |
| JP | 2009243357 | 10/2009 |
| JP | 2011038414 A | 2/2011 |
| WO | 2012116687 A1 | 9/2012 |

* cited by examiner

PISTON WITH OIL COOLING PASSAGE AND METHOD OF CONSTRUCTION THEREOF

CROSS-REFERENCE TO RELATED APPLICATION

This application claims the benefit of U.S. Provisional Application Ser. No. 61/674,120, filed Jul. 20, 2012, which is incorporated herein by reference in its entirety.

BACKGROUND OF THE INVENTION

1. Technical Field

This invention relates generally to internal combustion engines, and more particularly to pistons and to their method of construction.

2. Related Art

Engine manufacturers are encountering increasing demands to improve engine efficiencies and performance, including, but not limited to, improving fuel economy, improving fuel combustion, reducing oil consumption, increasing the exhaust temperature for subsequent use of the heat within the vehicle, increasing compression loads within the cylinder bores, decreasing weight and making engines more compact. Accordingly, it is desirable to increase the temperature and compression loads within the combustion chamber of the engine. However, by increasing the temperature and compression loads within the combustion chamber, the wear and physical demands on the piston are increased, particularly when the operating temperature of the piston exceeds 240-270 degrees Celsius, thereby reducing its potential useful life. A particular area for concern of elevated temperatures is along an upper combustion surface of the piston and within the internal region of the piston, such as an undercrown region of the piston.

Accordingly, it is known to promote cooling of the undercrown region via electrically powered oil pump systems that forcefully direct oil under pressure from an oil sump region upwardly into the undercrown region of the piston. Although known mechanical or electrically powered pumps can be effective at reducing the operating temperature of the piston, they come at a cost. Typically, the electrically powered pumps require about 2 to 3, kW of energy in a typical 6 cylinder heavy duty engine, and even more in larger engines. As such, the electrically powered pumps result in parasitic losses to the engine, which in turn results in reduced engine performance, reduced engine efficiency and reduced fuel economy.

A piston constructed in accordance with this invention overcomes at least the aforementioned disadvantages of known piston cooling systems, as will become apparent to those skilled in the art upon reading the disclosure and viewing the drawings herein.

SUMMARY OF THE INVENTION

A piston for an internal combustion engine constructed in accordance with one aspect of the invention is economical in manufacture and exhibits a long and useful life. The piston includes a piston body having an upper combustion surface and an annular cooling gallery surrounding an undercrown region with an outer wall depending from the upper combustion surface with an annular ring belt region formed in the outer wall adjacent the upper combustion surface. The ring belt region has at least one ring groove formed therein. At least one oil passage extends from the at least one ring groove to the cooling gallery. The oil passage has a first portion depending radially inwardly from the at least one ring groove and a second portion ascending radially inwardly from the first portion to the cooling gallery.

In accordance with further aspects of the invention, the cooling gallery has a bottom surface and the oil passage extends through the bottom surface.

In accordance with further aspects of the invention, the oil passage includes a tubular member extending into the cooling gallery upwardly from the bottom surface of the cooling gallery.

In accordance with another aspect of the invention, a counterbore depends from the bottom surface of the cooling gallery and the tubular member is fixed in the counterbore.

In accordance with yet another aspect of the invention, the piston body includes an upper part fixed to a lower part, wherein the oil passage is formed entirely in the lower part.

In accordance with yet another aspect of the invention, the piston body is constructed as a single, monolithic piece of material.

In accordance with yet another aspect of the invention, the first portion is formed as an annular groove extending about the outer wall.

In accordance with yet another aspect of the invention, the second portion is formed as a through hole extending through the outer wall into the cooling gallery and intersecting the first portion.

In accordance with another aspect of the invention, a plug is disposed within the through hole adjacent the outer wall to prevent oil flowing through the second portion from bypassing the cooling gallery.

In accordance with yet another aspect of the invention, a method of constructing a piston for an internal combustion engine is provided. The method includes forming a piston body having an upper combustion surface and an annular cooling gallery surrounding an undercrown region with an annular ring belt region depending from the upper combustion surface. Further, forming an oil ring groove in the ring belt region. Further yet, forming at least one oil passage extending from the oil ring groove to the cooling gallery by forming a first portion of the oil passage depending radially inwardly from the oil ring groove and a second portion ascending radially inwardly from the first portion to the cooling gallery.

In accordance with another aspect of the invention, the method can further include forming the oil passage extending through a bottom surface of the cooling gallery.

In accordance with another aspect of the invention, the method can further include forming a portion of the oil passage with a tubular member extending upwardly from the bottom surface of the cooling gallery.

In accordance with another aspect of the invention, the method can further include fixing the tubular member in a counterbore extending into the bottom surface of the cooling gallery.

In accordance with another aspect of the invention, the method can further include forming the piston body by fixing an upper part to a lower part, the upper part and lower part delimiting the cooling gallery and wherein the at least one oil passage is formed entirely in the lower part.

In accordance with another aspect of the invention, the method can further include forming the piston body as a monolithic piece of material.

In accordance with another aspect of the invention, the method further includes forming the second portion as a through hole extending through the outer wall into the cooling gallery and disposing a plug in the through hole adjacent the outer wall.

In accordance with another aspect of the invention, the method further includes forming the first portion as an annular groove extending about an outer circumference of the outer wall.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
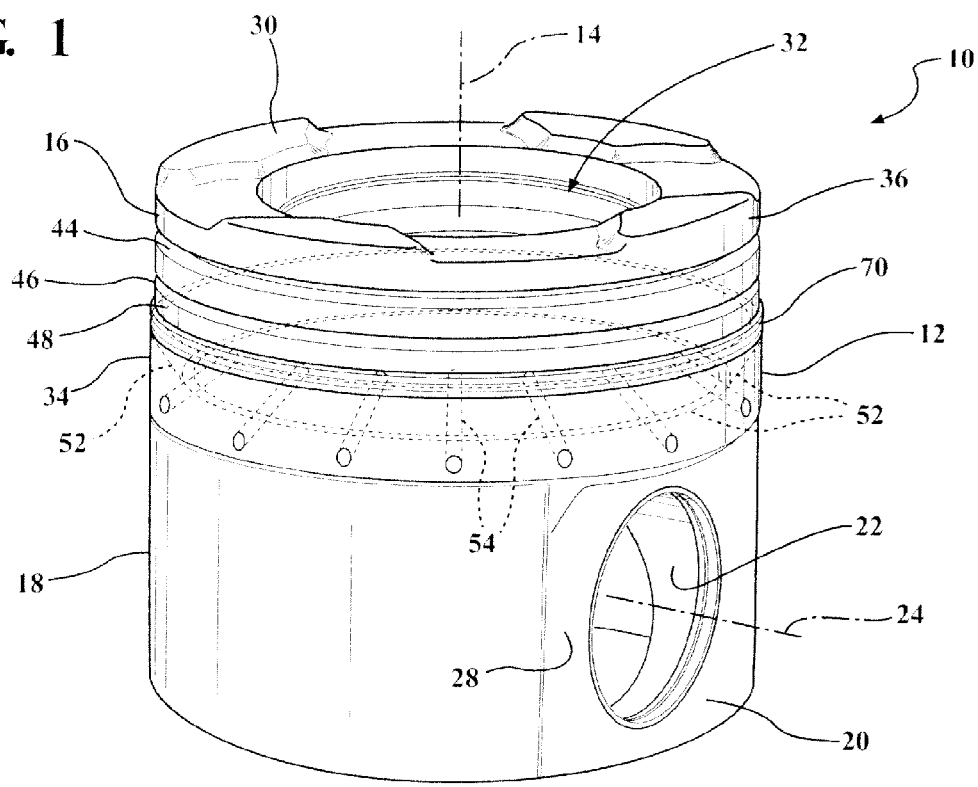
FIG. 1 is a perspective view of a piston constructed in accordance with one aspect of the invention.
Figure 1A:
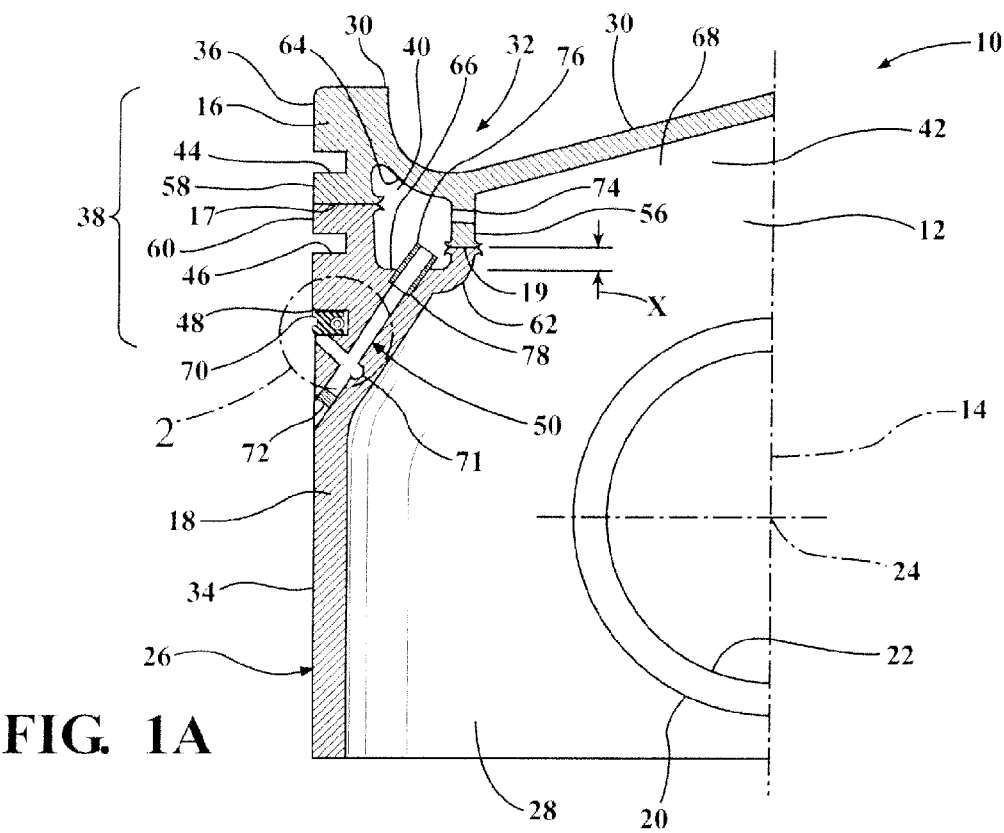
FIG. 1A is a cross-sectioned partial view of the piston of FIG. 1.

Referring in more detail to the drawings, FIG. 1 illustrates a piston 10 constructed in accordance with one aspect of the invention for reciprocating movement in a cylinder bore or chamber (not shown) of an internal combustion engine, such as a new generation high performance gas or diesel engine, such as used in high performance cars and heavy duty trucks, for example. The piston 10 has a body 12, either cast or forged, or formed by any other process of manufacture known in constructing pistons, whether monolithic, single pieces of material or multiple piece of material fixed together, extending along a central longitudinal axis 14 along which the piston 10 reciprocates in the cylinder bore. The body 12, as best illustrated in FIG. 1A, has two parts, including a top part, also referred to as upper crown 16, and a bottom part, also referred to as lower crown 18, fixedly joined to one another, such as via a welding process, e.g. friction welding process, along a friction weld joint or joints 17, 19, for example. Reference to "vertical", "top", "bottom", "upper" and "lower" herein are relative to the piston 10 being oriented along the vertical longitudinal central piston axis 14 along which the piston 10 reciprocates in use. This is for convenience for explaining relative feature locations and is not to be limiting since it is possible that the piston may be installed and operate at an angle or other than a purely vertical orientation. The lower crown 18 has a pair of pin bosses 20 extending away from the upper crown 16 to provide laterally spaced pin bores 22 aligned along a pin bore axis 24 that extends generally transverse to the central longitudinal axis 14. The pin bosses 20 are joined to diametrically spaced skirt portions 26 via strut portions 28. The upper crown 16 has an upper combustion surface 30, shown having a combustion bowl 32 recessed therein to provide a desired gas flow with the cylinder bore. The body 12 has an outer cylindrical or substantially cylindrical wall 34 depending from the upper combustion surface 30, including a vertically extending upper land 36 immediately adjacent the upper combustion surface 30 and a ring belt region 38 formed in the outer wall 34 adjacent the upper combustion surface 30 and depending vertically from the upper combustion surface 30 and upper land 36. An annular, toroid-shaped cooling gallery 40 is formed radially inwardly from, and in radial alignment with, the ring belt region 38. The cooling gallery 40 extends about, and circumferentially surrounds, an undercrown region 42 located directly beneath the upper combustion surface 30. The ring belt region 38 has at least one ring groove formed therein, shown as a plurality of ring grooves including a compression ring groove 44, a wiper ring groove 46, and a lowermost oil ring groove 48. At least one oil passage 50 extends continuously from the oil ring groove 48 to the cooling gallery 40.

As best shown in FIG. 1A, the oil passage 50 is formed as a continuous, uninterrupted passage that includes a first portion 52 depending (extending downwardly) radially inwardly from the oil ring groove 48 and a second portion 54 ascending (extending upwardly) radially inwardly directly from the first portion 52 to the cooling gallery 40. Accordingly, the oil passage 50 does not follow a continuous straight path, and thus, the downwardly and upwardly extending path formed by the oil passage 50 channels oil scraped from the cylinder wall into the cooling gallery 40 via a hydrostatic oil pressure wave generated in response to the upward and downward reciprocating movement of the piston 10. Accordingly, sufficient oil is assured of being supplied to the cooling gallery 40 and to the undercrown region 42 via the oil passage 50 to maintain the desired operating temperature of the piston 10 at temperatures coherent with the desired piston application, without having to supply oil from a mechanical or an electrically actuated oil pump. However, the thus scraped oil can also be used to supplement a lesser flow provided by existing pumping mechanisms, the total flow power absorption being less than a sole mechanical or electrical cooling oil supply, thereby maximizing the running efficiency and running performance of the engine.

The upper crown 16 is shown, by way of example and without limitation, as having an annular inner rib 56 that depends from an under surface of the combustion bowl 32 to an inner upper joining surface, also referred to as inner free end. The upper crown 16 also has an annular outer rib 58, formed as a portion of the wall 34, which depends to an outer upper joining surface, also referred to as outer free end. The compression ring groove 44 is shown as being formed in the upper crown 16, while the other grooves 46, 48 are shown as being formed in the lower crown 18.

Figure 2:
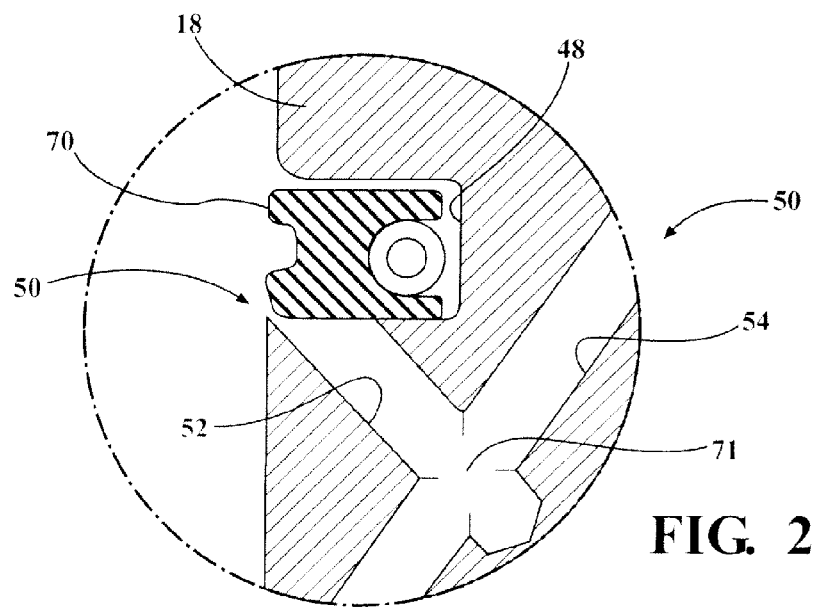
FIG. 2 is an enlarged cross-sectional view of the general area encircled by circle 2 of FIG. 1A.
Figure 1B:
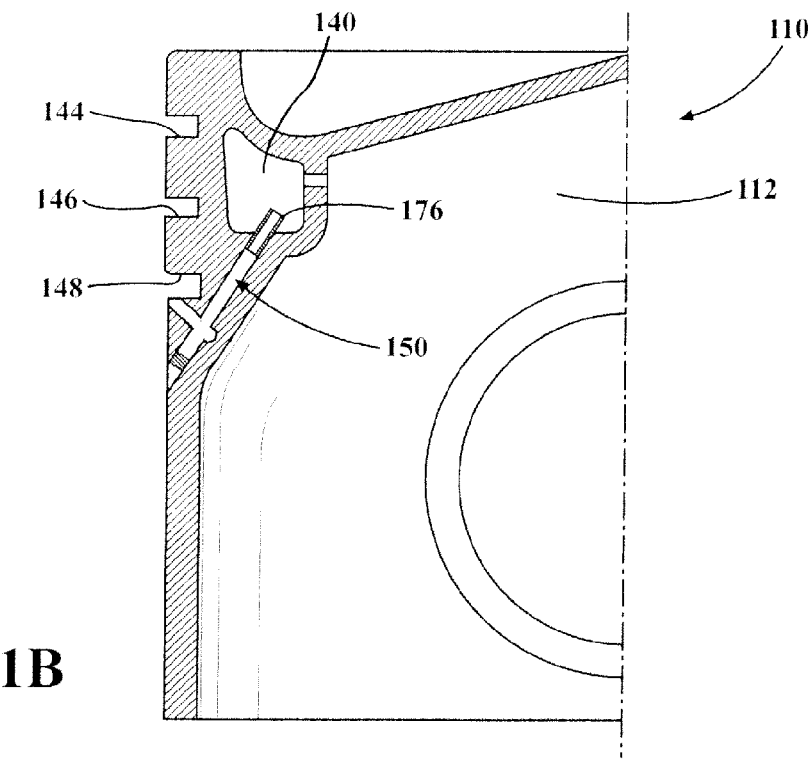
FIG. 1B is a view similar to FIG. 1A of a piston constructed in accordance with another aspect of the invention.

The lower crown 18 is constructed separately from the upper crown 16, such as in a forging process, by way of example and without limitation. The lower crown 18 is joined to the upper crown 16 via at least an upstanding annular outer lower joining surface, also referred to as upstanding annular outer rib 60, and is shown as also being joined to the upper crown 16 via an upstanding annular inner rib 62. Upon welding, such as friction welding, by way of example and without limitation, the upper and lower crowns 16, 18 to one another across their respective outer ribs 58, 60 and inner ribs 56, 62, the substantially closed outer oil gallery 40 is bounded by the ribs 56, 58, 60, 62 of the upper and lower crowns 16, 18 as well as an upper wall portion 64 of the combustion bowl 32, also referred to as ceiling, and further yet by a lowermost floor 66 of the cooling gallery 40, which is shown as being formed as part of the lower crown 18. Further, upon joining the upper and lower crowns 16, 18 to one another, an open inner gallery 68 is formed upwardly of the pin bores 22 beneath the central portion of the undercrown region 42, located radially inwardly from the cooling gallery 40. It should be recognized that the piston 10, constructed in accordance with the invention, could have upper and lower crown portions formed otherwise, having different configurations of oil galleries, for example. Further, the lower crown 18 is shown, by way of example, as forming a lower portion of the ring belt region 38 via inclusion of the wiper ring groove 46 as well as the lowermost oil ring groove 48 for receipt of an oil ring 70 (FIG. 2). However, it should be recognized these ring grooves 46, 48 could be formed within the upper crown 18, if desired. Further yet, as shown in FIG. 1B, wherein similar features as discussed above are identified with the same reference numerals as used above, offset by a factor of 100, a piston 110 constructed in accordance with another aspect of the invention could have a piston body 112 formed as a monolithic piece of material, thereby being a single piece of material. Of course, the piston body 112 includes all the same ring grooves, 144, 146, 148 discussed above, as well as a cooling gallery 140 and oil passage 150 including first and second portions 152, 154, as discussed above. As such, no further discussion regarding the monolithic piston body 112 is necessary.

The oil passage 50 includes the intersecting first and second portions 52, 54, shown in FIG. 1A, as being formed entirely in the lower crown 18, and thus, the first and second portions 52, 54 can be formed prior to fixing the upper and lower crowns 16, 18 to one another. The first portion 52 is machined as an annular groove, channel or recess into a bottom surface of the oil ring groove 48, and thus, the first portion 52 extends axially beneath the oil ring groove 48 in direct fluid communication with the oil ring groove 48. As such, the first portion 52 extends about the entire outer circumference of the ring belt region 38, and any oil scraped by the oil ring 70, such as during an upwardly stroke of the piston 10, is channel downwardly into the first portion 52 that extends about the entire outer periphery of the lower crown 18. From the first portion 52, the oil is then channeled upwardly, such as during a downward stroke of the piston 10, through the second portion 54 of the oil passage 50 into the cooling gallery 40. The second portion 54 is formed, such as in a drilling process, as a hole extending upwardly and radially inwardly through the outer surface of the cylindrical wall 34 into the cooling gallery 40, wherein the second portion 54 intersects the first portion 52 at an intersection 71. Accordingly, the first and second portions 52, 54 are in fluid communication with one another. With the second portion 54 being formed as a through hole extending through the outer surface of the outer wall 34 and through the floor 66 of the cooling gallery 40, a plug 72 is disposed in a press-fit into a location of the through hole immediately adjacent the outer surface of the cylindrical wall 34. As such, the plug 72 is between the outer surface of the outer wall 34 and the intersection 71 of the first and second portions 52, 54. As such, oil flowing within the oil passage 50 is prevented from exiting the lower portion of the through hole outwardly from the cylindrical wall 34, and thus, once the oil is collected in the first portion 52, the oil must continue flowing upwardly through the second portion 54 into the cooling gallery 40. Once in the cooling gallery 40, the oil is shaken in cocktail-shaker fashion, thereby cooling all the surfaces bounding the cooling gallery 40. As the oil is being shaken in the cooling gallery 40, the oil is then channeled outwardly from the cooling gallery 40 through an oil hole or port 74 and into the inner gallery 68. As such, the oil is further able to cool the undercrown region 42 and lubricate the inner most region of the piston 10, including the pin bosses 20, pin bores 22, and small end of the connecting rod.

Figures 1C, 1D:
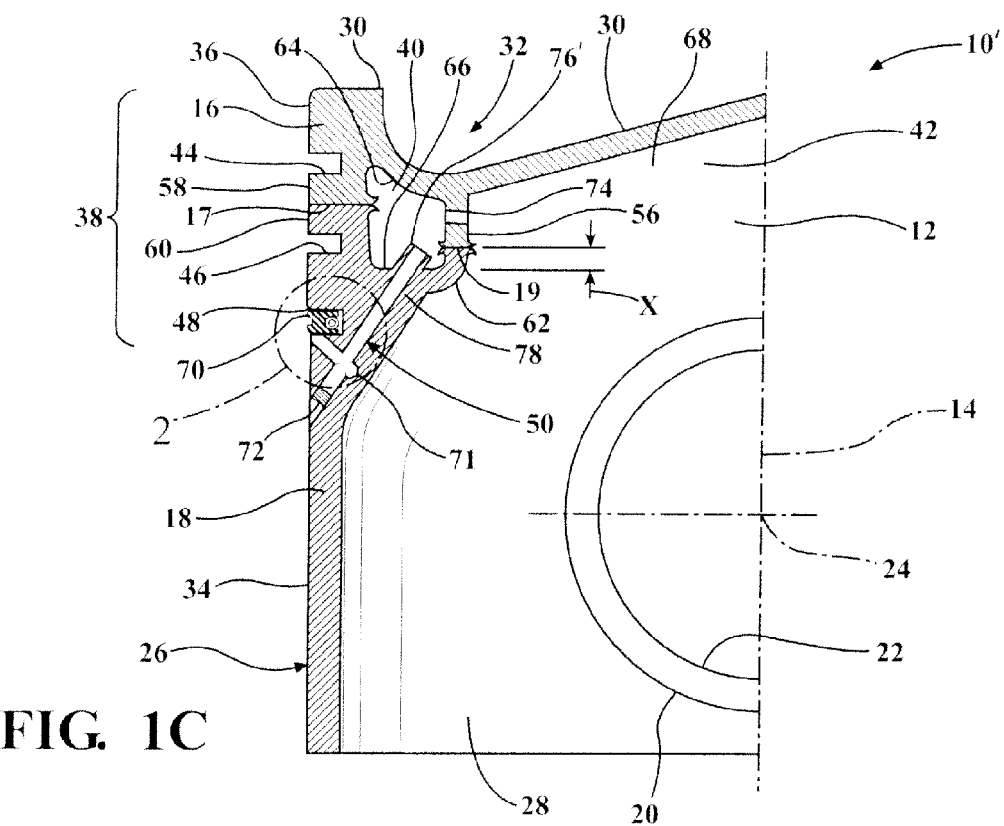
FIG. 1C is a view similar to FIG. 1A of a piston constructed in accordance with another aspect of the invention.
FIG. 1D is a view similar to FIG. 1B of a piston constructed in accordance with another aspect of the invention.

To facilitate channeling the oil from the cooling gallery 40 to the inner cooling gallery 68, and to inhibit the back flow of oil from the cooling gallery 40 back through the oil passage 50, a tubular member 76 is fixed within the second portion 54 to extend outwardly from the second portion 54. By way of example and without limitation, the tubular member 76 is shown being disposed in an enlarged counterbore 78 extending from the floor 66 into the second portion 54, thereby allowing the inner diameter of the tubular member 76 be the same or substantially the same as the inner diameter of the second portion 54, and thus, maximizing the flow of oil through the second portion 54 into the cooling chamber 40. Geometrical features can be designed at oil inlet 50 that will maximize the scraping and oil collection into the first portion 52. In the embodiment of FIG. 1A, the tubular member 76 is fixed within the counterbore 78 prior to fixing the upper and lower crowns 16, 18 to one another, as it would not be possible to extend the tubular member 76 through the second portion 54 since it has a larger outer diameter than the diameter of the second portion 54. In the embodiment of FIG. 1B, the tubular member 176 can be pushed into the second portion 154 formed by the through hole and into the cooling gallery 140, and thus, the tubular member 176 is provided having a press fit or line-to-line fit within the second portion 154. The tubular member 76 extends upwardly from the bottom surface 66 and outwardly from the second portion 54 in oblique relation to the central longitudinal axis 14 a predetermined distance X, such as between about 1.0-5.0 mm, and preferably between about 2.0-4.0 mm. As such, any oil pooling along the floor 66 of the cooling gallery 40 is not able to flow back through the oil passage 50, as the tubular member 76 extends above the pooled oil. Another means of accomplishing similar action would be to forge local lugs 76', 176' in pistons 10', 110', as shown in FIGS. 1C and 1D, respectively, on the floor 66, such that the lugs 76', 176' are monolithic pieces of material with the floor 66, and drilling through the lugs 76', 176', thereby providing the tubular member 76', 176' as a monolithic piece of material with the respective part 18, 112 of the piston 10', 110'. Accordingly, the oil flow path is assured of being unidirectional, flowing through the second portion 54 into the cooling chamber 54 and not in reverse, thereby assuring the desired amount of cooling is provided within the cooling gallery 40 before the oil is channel out of the cooling gallery 40 through the oil port 74.

In accordance with another aspect of the invention, a method of constructing a piston 10 for an internal combustion engine is provided. The method includes forming a piston body 12 having an upper combustion surface 30 and an annular cooling gallery 40 surrounding an undercrown region 42 with and annular ring belt region 38 depending from the upper combustion surface 30. Further, forming an annular oil ring groove 48 in the ring belt region 38. Further yet, forming at least one oil passage 50 extending from the oil ring groove 48 to the cooling gallery 40 by forming a first portion 52 of the oil passage 50 depending radially inwardly from the oil ring groove 48 and a second portion 54 ascending radially inwardly from the first portion 52 to the cooling gallery 40. The method further including forming the first portion 52 as an annular channel that extends about the entire circumference of the ring belt region 38.

The method, in accordance with another aspect of the invention, can further include forming the oil passage 50 through a bottom surface 66 of the cooling gallery 40. Further yet, in accordance with yet another aspect of the invention, the method can further include forming a portion of the oil passage 50 with a tubular member 76 extending upwardly from the bottom surface 66 of the cooling gallery 40 into the cooling gallery 40 a predetermined distance. Further yet, in accordance with yet another aspect of the invention, the method can include fixing the tubular member 76 in a counterbore 78 extending into the bottom surface 66 of the cooling gallery 40.

The method can further include forming the piston body 12 by fixing an upper part 16 to a lower part 18, with the upper and lower parts 16, 18 delimiting the cooling gallery 40 and forming the oil passage 50 in the lower part 18.

The method, in accordance with another aspect of the invention, further includes forming the first portion 52 as an annular groove extending continuously about the circumference of the piston head.

The method, in accordance with another aspect of the invention, further includes forming the second portion 54 as a hole, such as in a drilling operation. Further yet, the method includes forming the second portion 54 as a through hole being open at opposite ends and then plugging one of the ends adjacent an outer surface of a cylindrical wall 34, beneath the first portion 52, with a plug 72.

The method can further include forming the piston body 112 as a monolithic piece of material.

Accordingly, it should be recognized that an engine including a piston 10, 110, as described above and illustrated, greatly reduces the need for the consumption of energy by an electrically powered oil pump, if included, to effectively cool the piston below an operating temperature of coherent with the particular piston application. This results from the reduced demand placed on the oil pump to cool the piston 10, 110 due to the presence of the oil passage 50. Further, in some engines, it should be recognized that the need for a power consuming oil pump can be entirely done away with, and that the oil passage 50 can be solely responsible for maintaining the piston 10, 110 at operating temperatures below 240-270 degrees Celsius.

Obviously, many modifications and variations of the present invention are possible in light of the above teachings. It is, therefore, to be understood that within the scope of the appended claims, and any further claims ultimately allowed, the invention may be practiced otherwise than as specifically described.

What is claimed is:

1. A piston for an internal combustion engine, comprising:
   a piston body having an upper combustion surface and an annular cooling gallery surrounding an undercrown region with an outer wall depending from said upper combustion surface with an annular ring belt region formed in said outer wall adjacent said upper combustion surface, said ring belt region having at least one ring groove formed therein; and
   at least one oil passage extending continuously from said at least one ring groove to said cooling gallery, said at least one oil passage having a first portion depending radially inwardly from said at least one ring groove and a second portion ascending radially inwardly directly from said first portion to said cooling gallery, wherein said cooling gallery has a bottom surface, said at least one oil passage extending through said bottom surface, wherein said at least one oil passage includes a tubular member extending upwardly from said bottom surface.

2. The piston of claim 1 wherein said bottom surface has a counterbore extending therein along said at least one oil passage, said tubular member being fixed in said counterbore.

3. The piston of claim 1 wherein said tubular member is a monolithic piece of material with said bottom surface.

4. The piston of claim 1 wherein said piston body includes an upper part fixed to a lower part, said at least one oil passage being formed in said lower part.

5. The piston of claim 1 further including an oil port extending from said cooling gallery to said undercrown region.

6. The piston of claim 1 wherein said piston body is a monolithic piece of material.

7. The piston of claim 1 wherein said second portion is formed as a through hole extending through said outer wall into said cooling gallery, and further including a plug disposed in said through hole adjacent said outer wall.

8. The piston of claim 7 wherein said first and second portions intersect one another at an intersection, said plug being between said intersection and said outer wall.

9. The piston of claim 1 wherein said first portion is formed as an annular groove extending about said outer wall.

10. The piston of claim 9 wherein said second portion is formed as a through hole extending through said outer wall into said cooling gallery and intersecting said first portion.

11. A method of constructing a piston, comprising:
    forming a piston body having an upper combustion surface and an annular cooling gallery surrounding an undercrown region with an outer wall including an annular ring belt region depending from the upper combustion surface;
    forming a ring groove in the ring belt region;
    forming at least one oil passage extending continuously from the ring groove to the cooling gallery by forming a first portion of the oil passage depending radially inwardly from the ring groove and a second portion ascending radially inwardly from the first portion to the cooling gallery;
    further including forming the oil passage extending through a bottom surface of the cooling gallery; and
    further including forming a portion of the oil passage with a tubular member extending upwardly from the bottom surface of the cooling gallery.

12. The method of claim 11 further including fixing the tubular member in a counterbore extending into the bottom surface of the cooling gallery.

13. The method of claim 11 further including forming the tubular member extending through a lug formed as a monolithic piece of material with the bottom surface.

14. The method of claim 11 further including forming the piston body by fixing an upper part to a lower part, the upper part and lower part delimiting the cooling gallery and wherein the at least one oil passage is formed entirely in the lower part.

15. The method of claim 11 further including forming the piston body as a monolithic piece of material.

16. The method of claim 11 further including forming an oil port extending from the cooling gallery to the undercrown region.

17. The method of claim 11 further including forming the second portion as a through hole extending through the outer wall into the cooling gallery, and further including disposing a plug in the through hole adjacent the outer wall.

18. The method of claim 11 further including forming the first portion as an annular groove extending about an outer circumference of the outer wall.

19. The method of claim 18 further including forming the second portion as a through hole extending through the outer wall into the cooling gallery and intersecting the first portion.

* * * * *